(12) United States Patent
Eaton

(10) Patent No.: US 7,840,023 B2
(45) Date of Patent: *Nov. 23, 2010

(54) DOUBLE-RESONATOR MICRO-SPEAKER ASSEMBLIES AND METHODS FOR TUNING THE SAME

(75) Inventor: William Chris Eaton, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1067 days.

This patent is subject to a terminal disclaimer.

(21) Appl. No.: 11/525,768

(22) Filed: Sep. 22, 2006

(65) Prior Publication Data

US 2007/0014424 A1   Jan. 18, 2007

Related U.S. Application Data

(63) Continuation of application No. 10/256,745, filed on Sep. 27, 2002, now Pat. No. 7,123,736.

(51) Int. Cl.
   *H04R 25/00* (2006.01)
(52) U.S. Cl. .................. 381/351; 381/353; 181/160
(58) Field of Classification Search ......... 381/345–347, 381/349–350, 353–354, 160; 181/155–156, 181/189; 340/388; 379/433; 455/90, 347, 455/350
See application file for complete search history.

(56) References Cited

U.S. PATENT DOCUMENTS

| | | | |
|---|---|---|---|
| 3,819,879 A | 6/1974 | Baechtold | 375/242 |
| 4,336,861 A | 6/1982 | Peter | 181/144 |
| 5,012,890 A | 5/1991 | Nagi et al. | 381/96 |
| 5,092,424 A | 3/1992 | Schreiber et al. | 181/145 |
| 5,260,681 A | 11/1993 | Asai et al. | 340/388 |
| 5,261,006 A | 11/1993 | Nieuwendijk et al. | 381/353 |

(Continued)

FOREIGN PATENT DOCUMENTS

EP    0 489 551    6/1992

(Continued)

OTHER PUBLICATIONS

Japanese Office Action (2 pages) corresponding to Japanese Patent Application No. 2004-540071; Mailing Date: Oct. 31, 2008.

(Continued)

*Primary Examiner*—Fan Tsang
*Assistant Examiner*—Phylesha Dabney
(74) *Attorney, Agent, or Firm*—Myers Bigel Sibley & Sajovec

(57) ABSTRACT

Micro-speaker assemblies and mobile terminals including micro-speaker assemblies are provided. The micro-speaker assemblies include a micro-speaker positioned in a housing. A first forward tuning volume is positioned adjacent a front face of the micro-speaker. A passageway extends from the first forward tuning volume to an opening in the housing. A second forward tuning volume in fluid communication with the passageway is positioned at a location between the first forward tuning volume and the opening in the housing. The second forward tuning volume, the first forward tuning volume and the passageway define a double-resonator that tunes a frequency response of the micro-speaker. Methods for tuning micro-speakers are also provided.

4 Claims, 7 Drawing Sheets

U.S. PATENT DOCUMENTS

| | | | |
|---|---|---|---|
| 5,471,019 A | 11/1995 | Maire | 181/156 |
| 5,479,520 A | 12/1995 | Nieuwendijk et al. | 381/353 |
| 5,790,679 A | 8/1998 | Hawker et al. | 381/163 |
| 6,321,070 B1 | 11/2001 | Clark et al. | 455/90 |
| 6,389,146 B1 | 5/2002 | Croft | 381/345 |
| 6,473,625 B1 | 10/2002 | Williams et al. | 455/569.1 |
| 6,728,386 B1 | 4/2004 | Anderson | 381/345 |
| 6,758,303 B2 | 7/2004 | Zurek et al. | 181/155 |
| 2002/0085731 A1 | 7/2002 | Aylward | 381/349 |

FOREIGN PATENT DOCUMENTS

| | | |
|---|---|---|
| JP | 11-237887 A | 8/1999 |
| JP | 2002-501357 A | 1/2002 |
| WO | 02/34006 | 2/2002 |

OTHER PUBLICATIONS

International Search Report for PCT/US03/28665 dated Jan. 27, 2004.

DOUBLE-RESONATOR MICRO-SPEAKER ASSEMBLIES AND METHODS FOR TUNING THE SAME

RELATED APPLICATION

This application claims priority to and is a continuation of parent application Ser. No. 10/256,745, filed Sep. 27, 2002, now U.S. Pat. No. 7,123,736 the disclosure of which is hereby incorporated herein by reference.

BACKGROUND OF THE INVENTION

The present invention relates to speaker assemblies for personal use such as in cellular telephones and, more particularly, to tuned micro-speaker assemblies.

Manufacturers and designers of personal electronic devices, such as cellular radio telephones, frequently seek to reduce the overall dimensions of such devices while maintaining attractive style characteristics for the devices. One consequence of the reduced size for such devices that include a speaker is that less space may be available for the speaker. Furthermore, a variety of audio signal generation capabilities may be desired in such personal electronic devices including buzzers, voice signal generation and/or music or other higher frequency band signal reproduction and playback.

As the space available for the hardware supporting the audio signal generation capabilities decreases in the personal electronic devices, it may become more difficult to support multiple sound emitting output devices and the space available for each such device may become smaller. Furthermore, increased functionality in such personal electronic devices may require more of the reduced available space to be utilized for other functionality of the device. The reduction in the size of the audio output devices may also increase the difficulty of providing a desirable loudness level for signals, such as buzzer alert signals. In addition, to the extent features of the audio output device(s) are presented externally on the personal electronic device, the impact of those features on the appearance of the product and the flexibility to place such visible features at different locations on the device may become important.

For audio performance, it is known to use a speaker having relatively uniform frequency characteristics in the 300 hertz (Hz) to 3400 Hz voice frequency band. Where music or other complex signals are provided by the device, a speaker with a frequency range providing a bandwidth up to at least about 8000 Hz may be used. In addition, louder alert signals may be provided in various personal electronic devices.

SUMMARY OF THE INVENTION

Embodiments of the present invention provide micro-speaker assemblies and mobile terminals including micro-speaker assemblies. The micro-speaker assemblies include a micro-speaker positioned in a housing. A first forward tuning volume is positioned adjacent a front face of the micro-speaker. A passageway extends from the first forward tuning volume to an opening in the housing. A second forward tuning volume in fluid communication with the passageway is positioned at a location between the first forward tuning volume and the opening in the housing. The second forward tuning volume, the first forward tuning volume and the passageway define a double-resonator that tunes a frequency response of the micro-speaker.

In other embodiments of the present invention, micro-speaker assemblies are provided including a micro-speaker positioned in a housing. A double-resonator acoustically coupled to the micro-speaker has a first resonance frequency at an alert frequency above the voice frequency band and a second resonance frequency above the first resonance frequency. The first resonance frequency may be between about 3400 hertz (Hz) and 5000 Hz and the second resonance frequency may be between about 4000 Hz and about 10000 Hz. In particular embodiments of the present invention, the first resonance frequency is between about 3000 hertz (Hz) and about 4000 Hz and the second resonance frequency is between about 6000 Hz and about 8000 Hz.

In further embodiments of the present invention, methods are provided for tuning a micro-speaker. A volume of a first forward tuning volume adjacent a front face of a micro-speaker is selected to define a first resonant frequency of the micro-speaker. The first resonant frequency provides an amplitude response in a voice frequency range and a high amplitude response, greater that the response in the voice frequency range, at the first resonant frequency. A volume of a second forward tuning volume and a position of the second forward tuning volume on a passageway of the micro-speaker assembly extending from the first forward tuning volume to an opening in a housing containing the micro-speaker assembly are selected to define a second resonant frequency of the micro-speaker. The second resonant frequency is greater than the first resonant frequency. The second resonant frequency provides an amplitude response up to at least about 8000 hertz (Hz).

DETAILED DESCRIPTION

Figure 1:
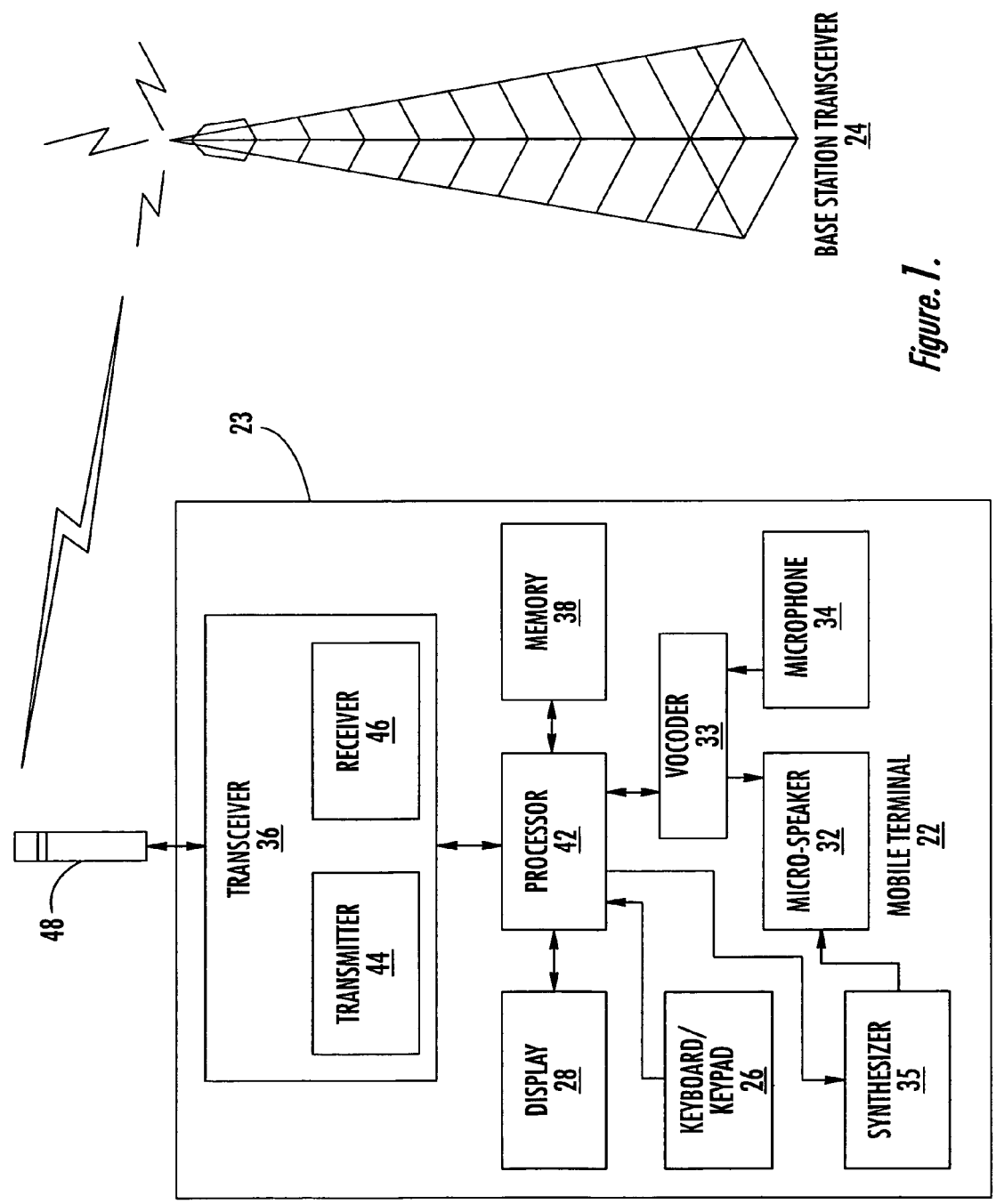
FIG. 1 is a schematic block diagram illustrating a mobile terminal including a tuned micro-speaker assembly according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is described below with reference to flowchart illustrations and/or block and/or flow diagrams of methods and mobile terminals or micro-speaker assemblies according to embodiments of the invention. It will be understood that each block of the flowchart illustrations related to methods, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block and/or flow diagram block or blocks.

Embodiments of the present invention will now be described with reference to the schematic block diagram illustration of a wireless terminal in FIG. 1. FIG. 1 illustrates an exemplary radiotelephone communication system, in accordance with embodiments of the present invention, which includes mobile wireless terminal 22 and a base station transceiver 24 of a wireless communications network. The mobile terminal 22 includes a portable housing 23 and may include a keyboard/keypad 26, a display 28, a micro-speaker assembly 32, a microphone 34, a transceiver 36, and a memory 38 that communicate with a controller/processor 42. The transceiver 36 typically comprises a transmitter circuit 44 and a receiver circuit 46, which respectively transmit outgoing radio frequency signals to the base station transceiver 24 and receive incoming radio frequency signals, such as voice signals, from the base station transceiver 24 via an antenna 48. The radio frequency signals transmitted between the mobile terminal 22 and the base station transceiver 24 may comprise both traffic and control signals (e.g., paging signals/messages for incoming calls), which are used to establish and maintain communication with another party or destination. The controller/processor 42 may support various functions of the mobile terminal 22, including decoding received voice signals from the receiver circuit 42 and providing the decoded voice signals to the micro-speaker assembly 32. As shown in FIG. 1, musical instrument digital interface (MIDI) signals may be supplied to the micro-speaker 32 by a MIDI synthesizer 35 for alerting and/or MMI feedback. Alternatively, synthesizers for other formats may be provided.

The foregoing components of the mobile terminal 22, other than the micro-speaker assembly 32, may be included in many conventional mobile terminals and their functionality is generally known to those skilled in the art. It should be further understood, that, as used herein, the term "mobile terminal" may include a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop portable computer, that may include a radiotelephone transceiver, or other portable device using a micro-speaker in a space constrained housing configuration.

In some embodiments of the present invention, the base station transceiver 24 comprises the radio transceiver(s) that define an individual cell in a cellular network and communicate with the mobile terminal 22 and other mobile terminals in the cell using a radio-link protocol. Although only a single base station transceiver 24 is shown, it will be understood that many base station transceivers may be connected through, for example, a mobile switching center and other devices to define a wireless communications network.

Although the present invention may be embodied in communication devices or systems, such as the mobile terminal 22 and/or the base station transceiver 24, the present invention is not limited to such devices and/or systems. Instead, the present invention may be embodied in any apparatus that utilizes a tuned micro-speaker.

Figure 2:
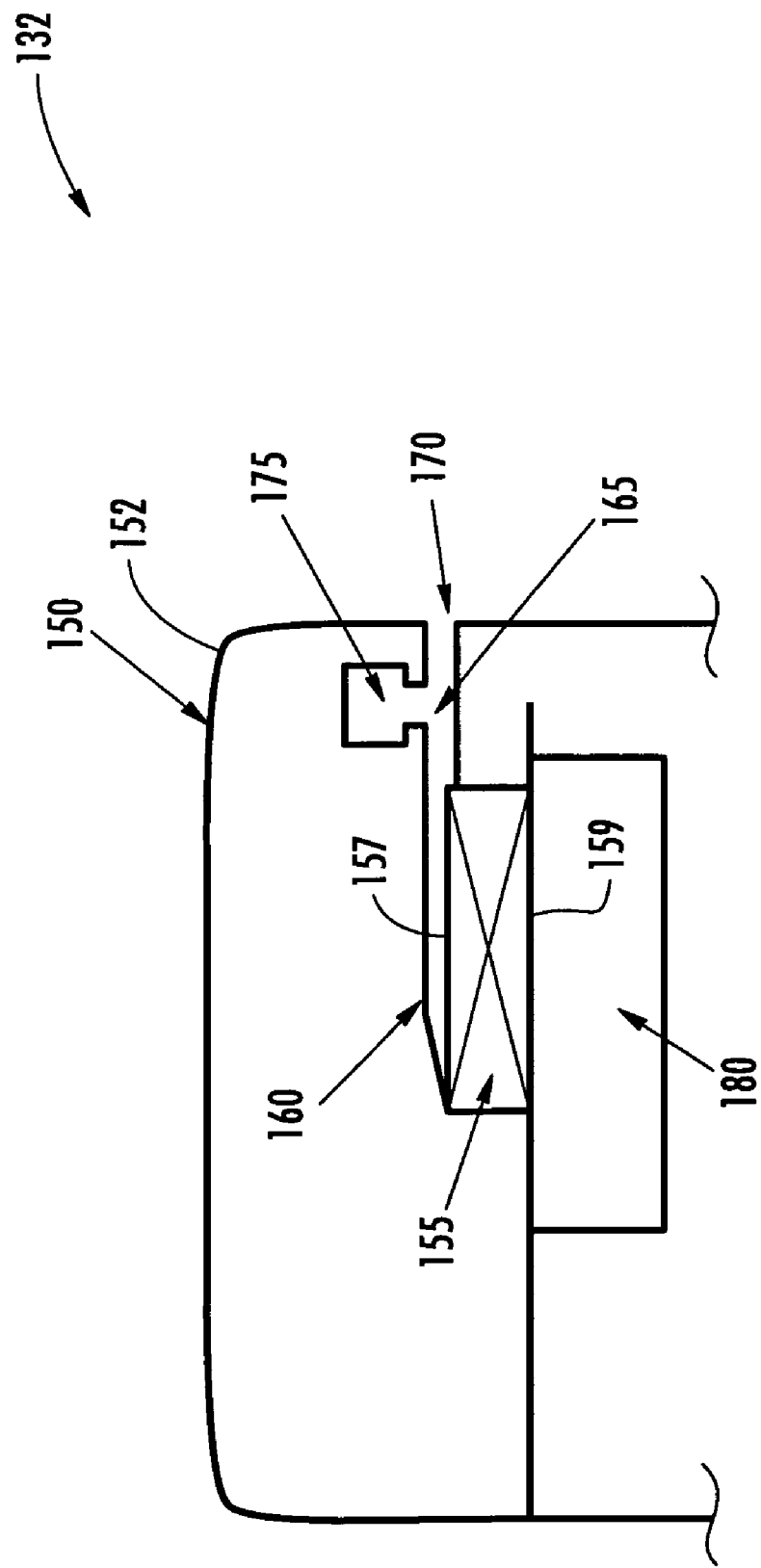
FIG. 2 is a schematic cross-section illustrating a tuned micro-speaker assembly according to embodiments of the present invention.

A tuned micro-speaker assembly according to embodiments of the present invention will now be further described with reference to the schematic block diagram illustration of FIG. 2. As shown in the embodiments of FIG. 2, the micro-speaker assembly 132 includes a micro-speaker 155 positioned in a housing 150. Only a portion of the housing 150 is shown in FIG. 2 and the housing 150 may include other components that are not directly related to the micro-speaker assembly 132. The micro-speaker 155 includes a first face 157 and a second face 159 positioned opposite from the first face 157. A first forward tuning volume 160 is located adjacent the first face 157 of the micro-speaker 155. A passageway 165 extends from the first forward tuning volume 160 to an opening 170 in the housing 150.

A second forward tuning volume 175 is located in fluid communication with the passageway 165. The second forward tuning volume 175 is positioned at a location between the first forward tuning volume 160 and the opening 170 in the housing 150. Thus, on the forward side of the micro-speaker 155, the second forward tuning volume 175, the first forward tuning volume 160 and the passageway 165 define a double-resonator that tunes the frequency response of the micro-speaker 155. As will be further described herein, the double-resonator acoustically coupled to the micro-speaker 155 may have a first resonance frequency at an alert frequency above the voice frequency band and a second resonance frequency above the first resonance frequency. The first resonance frequency may be between about 3400 hertz (Hz) and 5000 Hz and the second resonance frequency may be between about 4000 Hz and about 10000 Hz. In particular embodiments of the present invention, the first resonance frequency is between about 3000 hertz (Hz) and about 4000 Hz and the second resonance frequency is between about 6000 Hz and about 8000 Hz. As used herein, "double-resonator" also includes higher order resonators and the present invention is not limited to resonator circuits having only two resonance frequencies.

The micro-speaker assembly 132 may be used as the micro-speaker assembly 32 in a mobile terminal 22 such as illustrated in FIG. 1. In such a case, the portable housing 23 of the mobile terminal 22 may serve as the housing 150 of the micro-speaker assembly 132. It is to be further understood that, while the illustration of FIG. 2 shows a side opening 170 for a micro-speaker assembly 132, the invention is not limited to such a porting and may also be ported to the top of the mobile terminal 22 or other location, for example, to avoid peak acoustic exposure to high sound levels at an earpiece position of the mobile terminal 22 without having an unacceptable impact on the frequency response of the micro-speaker 155. In further embodiments, it will be understood that the micro-speaker 155 may be ported through or integrated into an antenna or other hardware of the mobile terminal 22, as well as the configuration illustrated in FIG. 2, without significant degradation of the audio performance of the micro-speaker assemble 132.

As further illustrated in FIG. 2, the micro-speaker assembly 132 may include a back tuning volume 180, which may be located adjacent the second face 159 of the micro-speaker 155. While the relative volumes of the respective tuning volumes 160, 175, 180 are merely illustrative and not intended to limit the present invention, in various embodiments of the present invention, the back tuning volume 180 is at least an order of magnitude larger than each of the first forward tuning volume 160 and the second forward tuning volume 175. For example, the passageway 165 may extend about 5 millimeters (mm) and the first 160 and second 175 forward tuning volumes may each be less than about 0.2 cubic centimeters.

Micro-speaker 155, in various embodiments has a diameter of between about 10 millimeters (mm) and about 20 mm. In other embodiments, the opening 170 may have an area of less than about 10 square millimeters ($mm^2$). Such a small port size may be about half the size, or less, of typical existing porting strategies for micro-speakers. The use of such smaller porting size openings for the opening 170 may, for example, be desirable to reduce interference or detraction from the appearance of the mobile terminal 22 or other device in which the micro-speaker assembly 132 is located.

Figure 3:
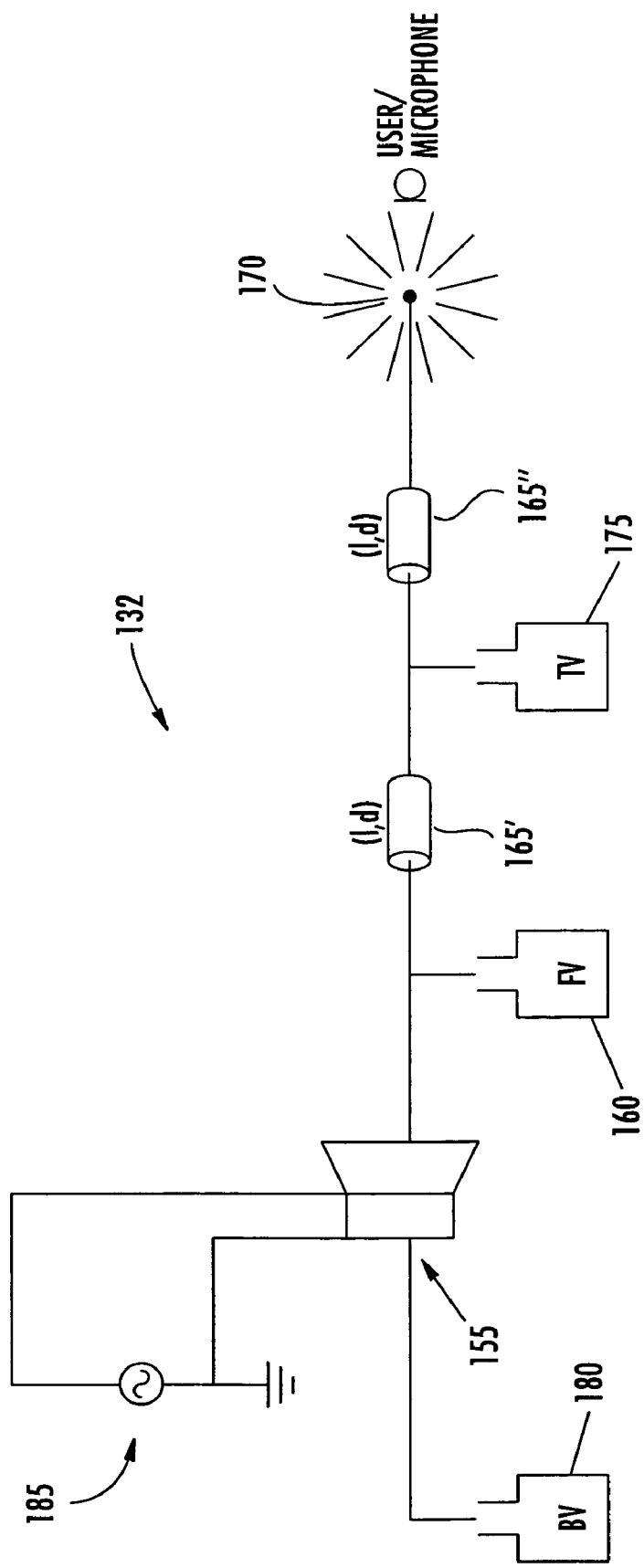
FIG. 3 is a schematic diagram illustrating a mechanical to acoustical analogy model of the tuned micro-speaker of FIG. 2.

FIG. 3 is a schematic diagram illustrating a mechanical to acoustical analogy model for the tuned micro-speaker assembly illustrated in FIG. 2. In FIG. 3, volumes of the tuning volumes are represented as compliance FV for the first forward tuning volume 160, TV for the second forward tuning volume 175, and BV for the back tuning volume 180. Furthermore, the passageway 165 includes a first section 165' extending from the first forward tuning volume 160 to the second forward tuning volume 175 and a second section 165" extending from the second forward tuning volume 175 to the opening 170 in the housing 150. The signal from the speaker 155 radiates from the opening 170 into the air to be received by a user or a microphone or other hearing device. As shown in FIG. 3, each of the passageway segments 165', 165" is characterized by a length (l) and a diameter (d).

Also shown in FIG. 3 is a frequency generator 185. The frequency generator 185, or other signal source, provides a voltage (and/or current) driving signal to the micro-speaker 155.

As seen in FIG. 3, the effect of having two front tuning volumes 160, 175 and the passageway 165', 165", provides a double-resonator for the micro-speaker assembly 132 which, as will be described further herein, in some embodiments may be used to provide both good alerting performance and extend the frequency response of the micro-speaker assembly 132 above the voice frequency range.

Figure 4:
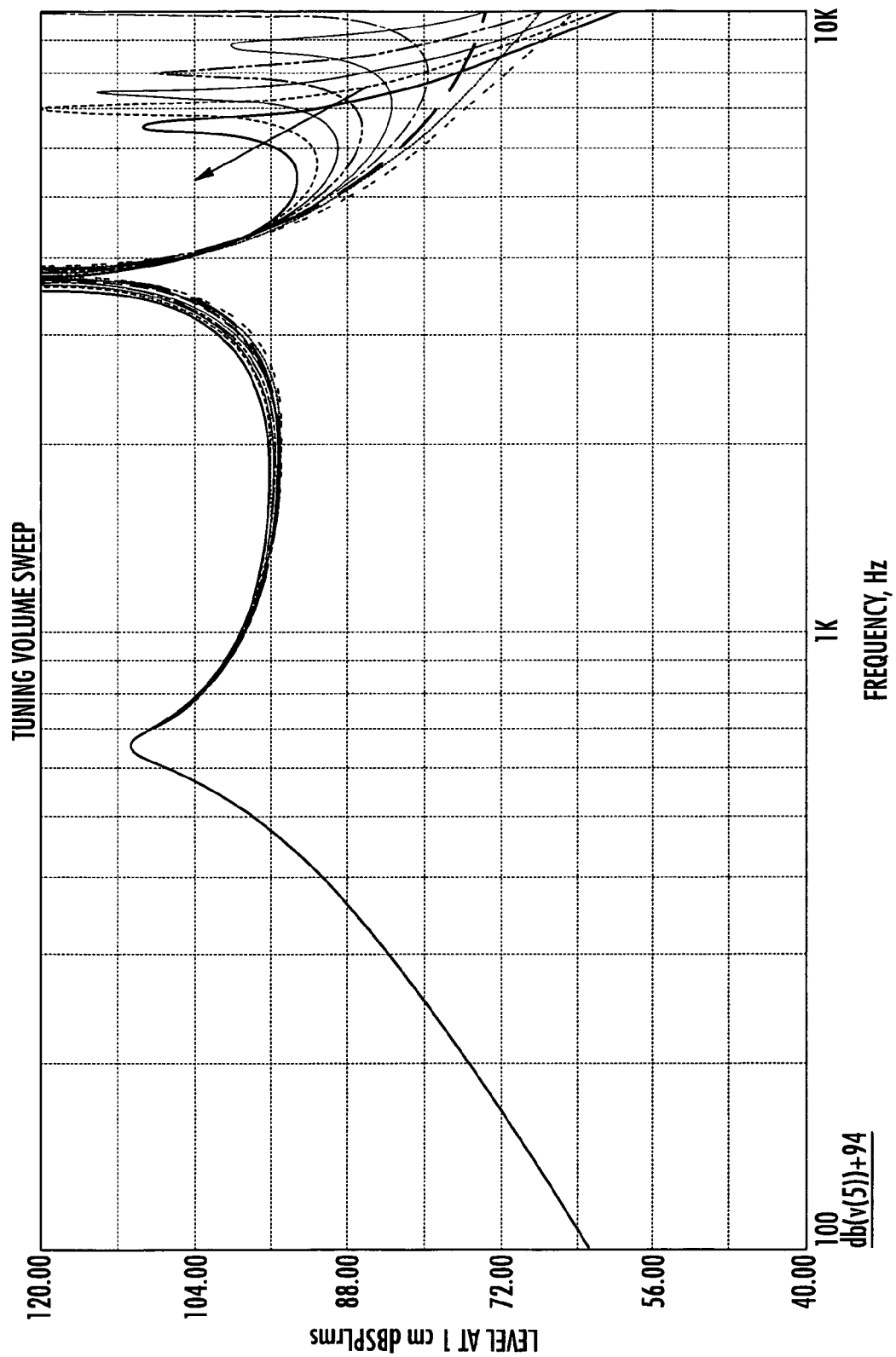
FIG. 4 is a semi-logarithmic graph illustrating predicted frequency response through an extended frequency range for tuned micro-speaker assemblies according to embodiments of the present invention with different second tuning volume configurations.
Figure 5:
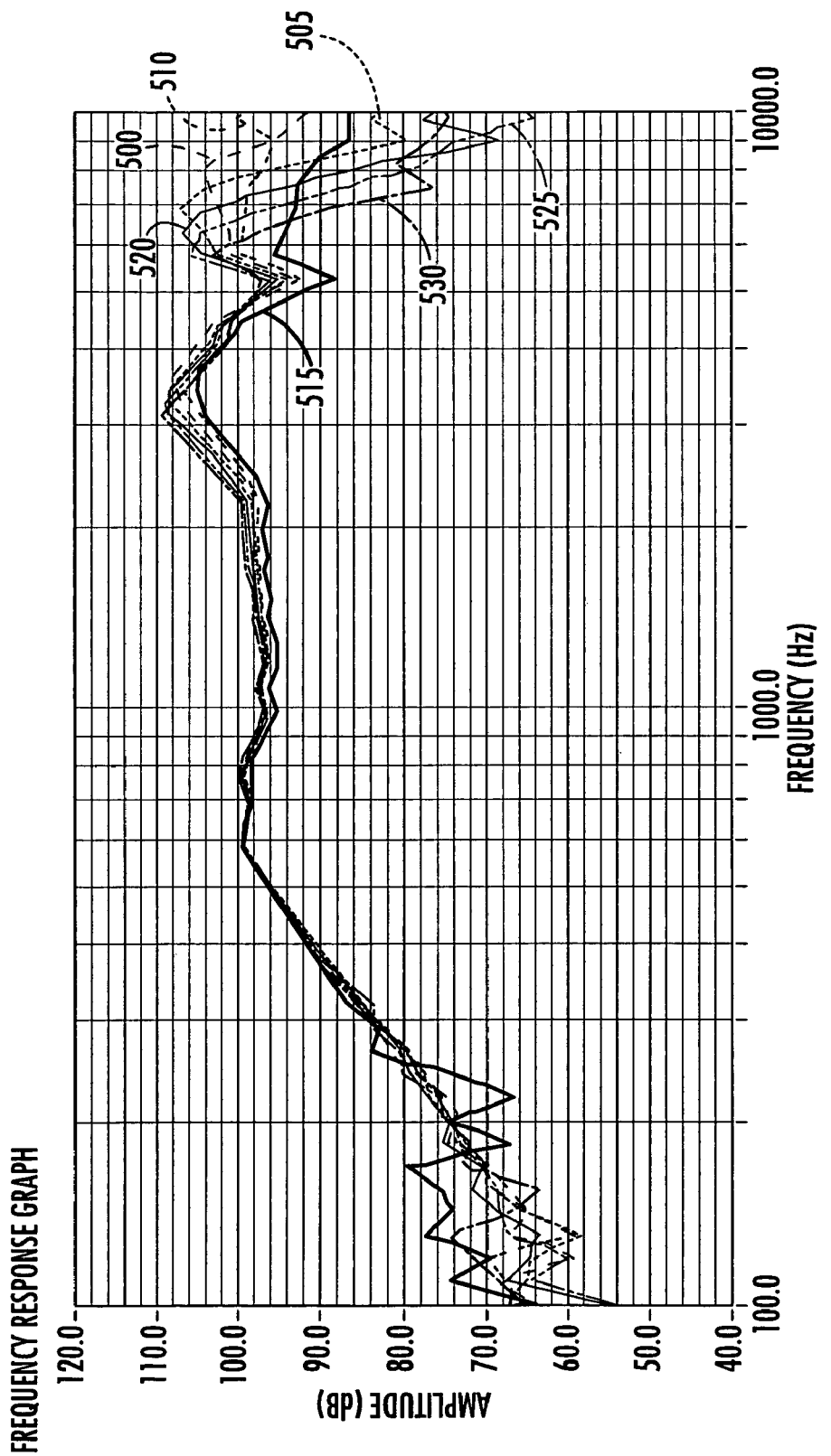
FIG. 5 is a semi-logarithmic graph illustrating frequency response through an extended frequency range for tuned micro-speaker assemblies according to embodiments of the present invention with different second tuning volume configurations.
Figure 6:
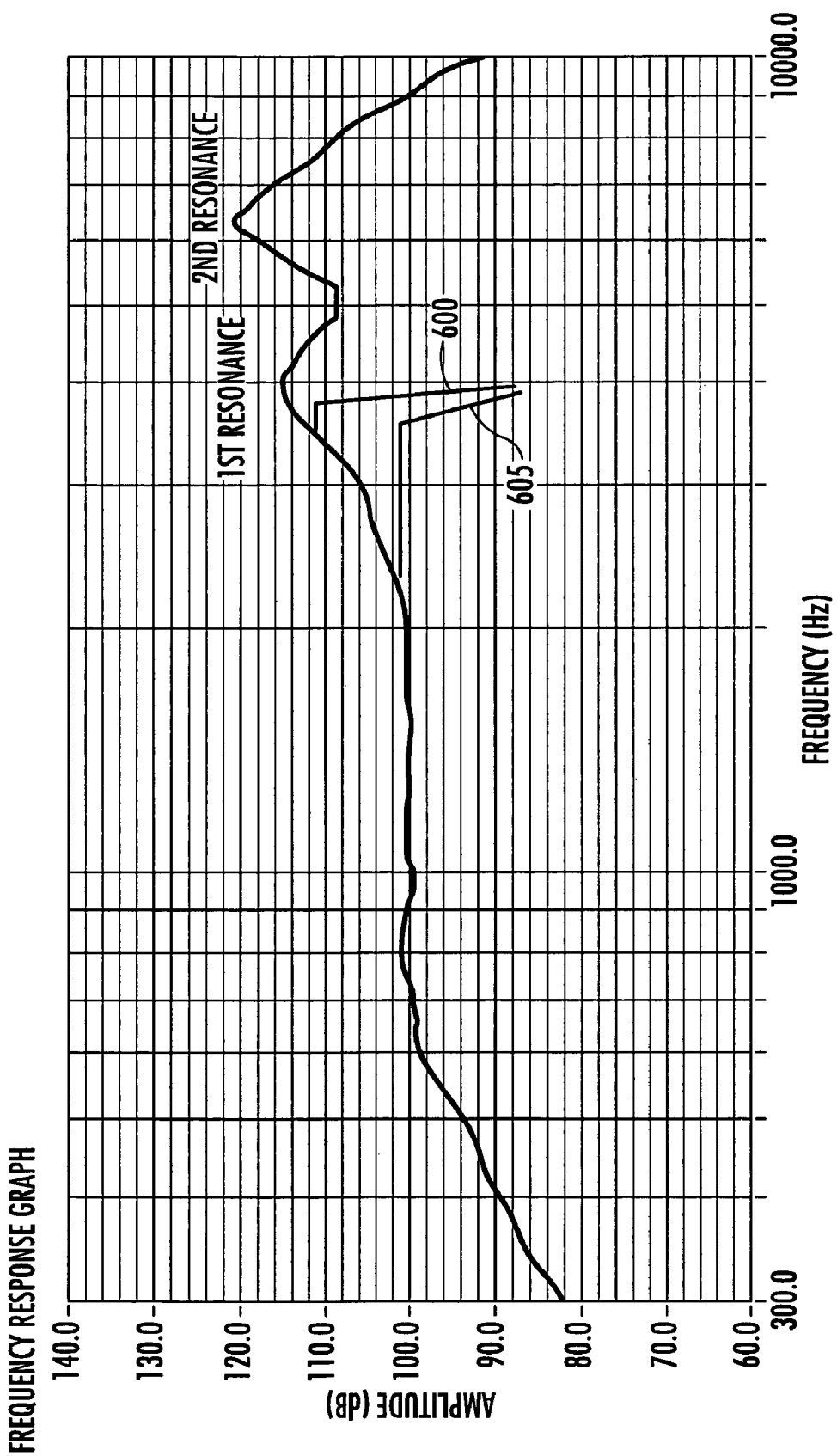
FIG. 6 is a semi-logarithmic graph illustrating frequency response through an extended frequency range for a tuned micro-speaker assembly according to embodiments of the present invention.

FIGS. 4-6 are semi-logarithmic graphic illustrations of frequency response for tuned micro-speaker assemblies according to various embodiments of the present invention. More particularly, FIGS. 4 and 5 illustrate the effect of increasing or decreasing the size of the second forward tuning volume 175 on the frequency response of the micro-speaker 155. FIG. 4 illustrates the predicted response of the micro-speaker 155 based on a mathematical model of the micro-speaker assembly 132 as illustrated in FIG. 3. The arrow shown in FIG. 4 in the extended frequency range above the first resonant frequency shows the trends of the curve in the extended frequency range with increasing volume of the second forward tuning volume 175. Thus, increased volume of the second forward tuning volume 175 can be seen to lower the amplitude of the second (or higher) frequency resonance point while increasing the amplitude in the extended frequency range above approximately 4000 hertz (Hz). More particularly, the amplitude output illustrated in the graph of FIG. 4 corresponds to a level measured in decibels sound pressure level root mean square (referenced to 20 microPascals) ($dBSPL_{rms}$) at 1 centimeter (cm) from the opening 170 of the micro-speaker assembly 132 when the frequency generator 185 sweeps through the frequency band providing a 1 $volt_{rms}$ input to the micro-speaker 155. The micro-speaker utilized to generate the results shown in FIG. 4 is an 8 ohm, 15 millimeter diameter micro-speaker.

FIG. 5 is a semi-logarithmic graph illustrating test data of measurements from micro-speaker assembly 132 in accordance with the mechanical model illustrated in FIG. 3 used to demonstrate the effect of micro-speaker tuning in accordance with various embodiments of the present invention. For the embodiments illustrated in FIG. 5, the back tuning volume 180 is 2.5 cubic centimeters, the first forward tuning volume 160 is 0.18 cubic centimeters and the second forward tuning volume 175 is 0.15 cubic centimeters. The opening 170 is 2.65 millimeter square (or equivalently, a 3 millimeter diameter providing substantially the same opening area where the passageway is a tube). For the results illustrated in FIG. 5, the second forward tuning volume 175 is positioned adjacent a wall 152 defining the housing 150 resulting in a second passageway section 165" having a length of 1.5 millimeters, corresponding to the thickness of a typical plastic mobile terminal wall. The first passageway section 165' has a length of 3.5 millimeters. Again, performance for different volumes of the second forward tuning volume 175 (up through 0.3 cubic centimeters) are shown by the various curves in FIG. 5. In particular, the illustrated response curves correspond to a second forward tuning volume of 100 cubic millimeters ($mm^3$) 500, 150 $mm^3$ 505, 50 $mm^3$ 510, 0 $mm^3$ 515, 200 $mm^3$ 520, 250 $mm^3$ 525 and 300 $mm^3$ 530.

The performance of a particular selected design of a micro-speaker assembly in accordance with the present invention is further illustrated in the semi-logarithmic graph of FIG. 6. As shown in FIG. 6, second resonance frequency for the dual-resonator is between 6000 hertz and 7000 hertz. The first resonance falls at an alert frequency at or just below 4000 hertz. The amplitude lift provided by the second resonance substantially nearly doubles the bandwidth of the micro-speaker assembly above the voice frequency range of about 300 hertz to about 3400 hertz, providing a bandwidth to the system of about 10,000 hertz. Such an extend frequency response may support, for example, polyphonic ring tone and melodies (such as from a MIDI synthesizer or MP3 file playback or the like). The placement of the first resonance at about 4000 hertz is selected to provide a high amplitude alerting performance from about 3000 hertz to about 4000 hertz (and up to even about 8000 hertz for harmonics of the alerting ring frequency). While the scale has been changed for the amplitude displayed in FIG. 6 as compared to FIGS. 3-5, as illustrated in FIG. 6, a one $V_{rms}$ input to the micro-speaker yields a 115 $dBSPL_{rms}$ at resonance, a performance comparable with typical high quality buzzers in portable devices.

With the performance for the system as illustrated in FIG. 6, in processing voice signals, such as in a speaker phone mode for a mobile terminal, as the first resonance is at about 4000 hertz instead of 3000 hertz, the effect of a low pass filter, such as may typically be found in the coder/decoder (codec) of a mobile terminal (shown by the curve 600 in FIG. 6), starts to attenuate below the resonance frequency, utilizing this effect to shape the curve. If a smoother curve is desired, a finite impulse response (FIR) filter could be utilized, as shown by the curve 605 in FIG. 6, to provide fine tuning to the frequency response of the micro-speaker assembly. Also note that, while FIG. 6 does not illustrate the effective changes in the tuning volume of the second forward tuning volume 175, as shown in FIG. 4, the dependence on such tuning volume of the first resonance is expected to be small. Thus, the first resonance could readily be moved to lower frequencies, for example, by increasing the volume of the first forward tuning volume 160 to lower the first resonance frequency.

As illustrated by the discussion of the present invention above, micro-speakers in accordance with various embodiments of the present invention may support high alerting ring levels while maintaining adequate level frequency response for speaker phone mode in the voice frequency range as well as extending frequency response bandwidth for polyphonic melodies (MIDI, MP3, etc.). Such a frequency response may be provided without requiring the use of a large opening size from the housing of the micro-speaker assembly and, further, while allowing peak acoustic concerns in mobile terminal design to be addressed through porting of the speaker to the top or side of the mobile terminal instead of an earpiece. Furthermore, the porting of the micro-speaker may, in various embodiments, be provided through the main antenna or other features of the mobile terminal such as a printed circuit board (PCB) of the mobile terminal.

As shown by the frequency response curves of FIGS. 4-6, in various embodiments of the present invention, the micro-speaker 155 is tuned to provide an amplitude response in the voice frequency range and a high amplitude response, greater than the response at the voice frequency range, at an alert frequency. The amplitude response in the voice frequency range may be at least about −20 decibels (dB) or, in further embodiments, at least about −10 dB, when measured at about one centimeter (cm). The alert frequency may be between about 3000 hertz and about 4000 hertz as shown by the approximately 4000 hertz first resonance for the alert frequency in FIG. 6. An amplitude response is also provided, through the use of the double-resonator, in an extended frequency range above the voice frequency range, such as to at least about 8000 hertz or, as shown in FIG. 6, to at least about 10,000 hertz. The minimum amplitude response in the extended frequency range, as in the voice frequency range, may be about −20 dB. The second resonance frequency may be between about 6000 hertz and about 8000 hertz. Thus, in various embodiments, the micro-speaker may be provided a bandwidth of at least about 8000 hertz and, in further embodiments, a bandwidth of at least about 10,000 hertz. Thus, the double-resonator provided by the micro-speaker assembly of the present invention may extend the frequency response of the micro-speaker above the voice frequency range and provide loud alert frequency signals.

Figure 7:
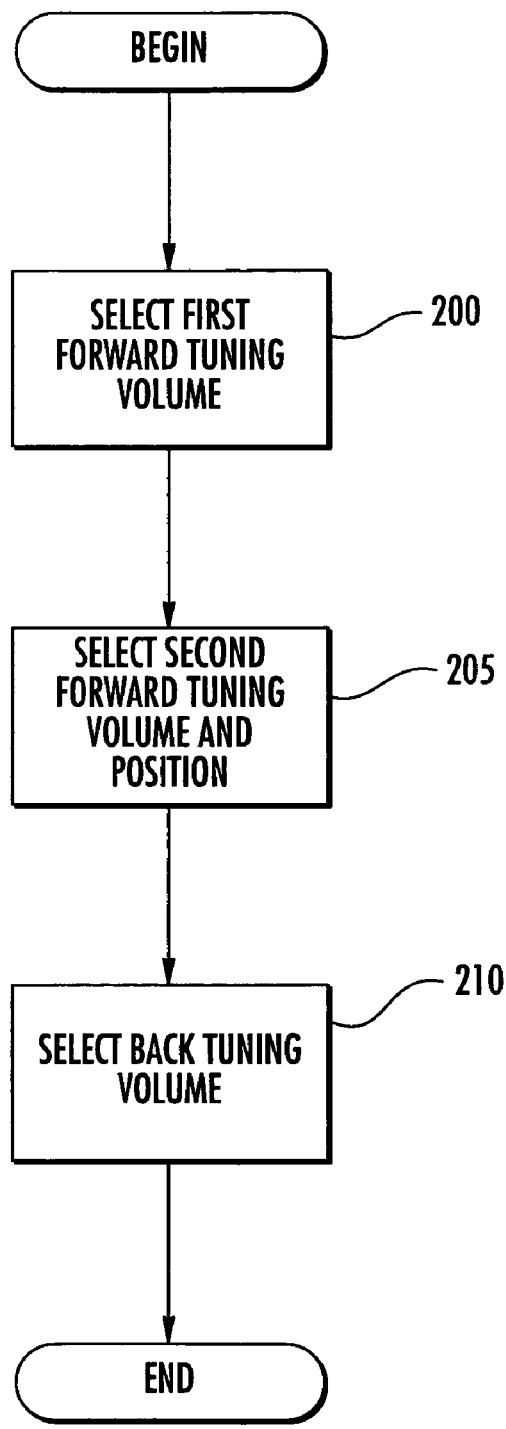
FIG. 7 is a flow chart illustrating operations for tuning a micro-speaker assembly according to embodiments of the present invention.

FIG. 7 is a flowchart illustration of operations that may be carried out to tune a micro-speaker 155 according to various embodiments of the present invention. As illustrated in the flowchart of FIG. 7, operations for tuning of the micro-speaker 155 include selecting a volume of first forward tuning volume adjacent a front face of the micro-speaker to define a first resonance frequency of a micro-speaker. (Block 200). The first resonance frequency provides at least a minimum amplitude of response in the voice frequency range (about 300 hertz to about 3400 hertz). It further provides a high amplitude response, greater than the response of the voice frequency range, at the first resonance frequency which may, therefore, be used as an alert frequency. The volume of a second forward tuning volume and the position of the second forward tuning volume on a passageway of the micro-speaker assembly extending from the first forward tuning volume to the opening in a housing containing the micro-speaker assembly is selected. (Block 205). The selection of the volume and position of the second forward tuning volume may be used to define a second resonance frequency of the micro-speaker. The second resonance frequency is greater (at a higher frequency) than the first resonance frequency. In some embodiments of the present invention tuning operations include selecting a volume for a back tuning volume (Block 210).

The flowcharts, flow diagrams and block diagrams of FIGS. 1 and 7 illustrate the architecture, functionality, and operation of possible implementations of methods for tuning micro-speaker assemblies. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A mobile terminal, comprising:
 a portable housing;
 a micro-speaker positioned in the housing, the micro-speaker comprising a housing including a vibratory member mounted therein and defining a plane of the micro-speaker;
 a first forward tuning volume adjacent a front face of the micro-speaker;
 a passageway extending from the first forward tuning volume to an opening in the housing; and
 a second forward tuning volume in fluid communication with the passageway and positioned at a location between the first forward tuning volume and the opening in the housing, the second forward tuning volume, the first forward tuning volume and the passageway defining a double-resonator that tunes a frequency response of the micro-speaker;
 wherein the first forward tuning volume includes the entire area in front of and adjacent the micro-speaker and extends in a plane substantially parallel to the plane of the micro-speaker and the passageway is an extension of the first forward tuning volume extended to an outside opening in the phone housing, at least part of which passageway extends in the plane of the first forward tuning volume and wherein the entire area of the first forward tuning volume extending over the micro-speaker and the entire length of the passageway are in the same plane.

2. A mobile terminal, comprising:
 a portable housing;
 a micro-speaker positioned in the housing, the micro-speaker comprising a housing including a vibratory member mounted therein and defining a plane of the micro-speaker;
 a first forward tuning volume adjacent a front face of the micro-speaker;
 a passageway extending from the first forward tuning volume to an opening in the housing; and
 a second forward tuning volume in fluid communication with the passageway and positioned at a location between the first forward tuning volume and the opening in the housing, the second forward tuning volume, the first forward tuning volume and the passageway defining a double-resonator that tunes a frequency response of the micro-speaker;

wherein the first forward tuning volume includes the entire area in front of and adjacent the micro-speaker and extends in a plane substantially parallel to the plane of the micro-speaker and the passageway is an extension of the first forward tuning volume extended to an outside opening in the phone housing, at least part of which passageway extends in the plane of the first forward tuning volume and wherein where the first forward tuning volume covers an area larger than a surface area of the micro-speaker.

3. The mobile terminal of claim 2, wherein substantially all of the passageway extends in the plane of the first forward tuning volume.

4. A mobile terminal, comprising:

a portable housing;

a micro-speaker positioned in the housing;

a first forward tuning volume in the housing external to the micro-speaker and adjacent a front face of the micro-speaker;

a passageway extending from the first forward tuning volume to an opening in the housing, the opening having an area of less than about 10 square millimeters ($mm^2$);

a second forward tuning volume in the housing in fluid communication with the passageway and positioned at a location between the first forward tuning volume and the opening in the housing, the second forward tuning volume, the first forward tuning volume and the passageway defining a double-resonator that tunes a frequency response of the micro-speaker, the frequency response defining an alert frequency between about 3000 hertz (Hz) and about 4000 Hz and a minimum amplitude response in the voice frequency range of at least about −10 decibels (dB) and an increased frequency response having an amplitude response of at least about −20 dB in an extended frequency range up to at least about 8000 hertz (Hz), the frequency response including a first resonant frequency at about the alert frequency and a second resonant frequency between about 6000 Hz and 8000 Hz; and a back tuning volume adjacent a side of the micro-speaker opposite the first forward tuning volume, wherein the back tuning volume is at least an order of magnitude larger than each of the first forward tuning volume and the second forward tuning volume.

* * * * *